United States Patent
Niehaus

(10) Patent No.: US 6,174,101 B1
(45) Date of Patent: Jan. 16, 2001

(54) ROTATING JOINT FOR A PROFILED CROSSBEAM

(76) Inventor: Joachim Niehaus, Bahnhofstrasse 3, D-59469 Ense (DE)

(*) Notice: Under 35 U.S.C. 154(b), the term of this patent shall be extended for 0 days.

(21) Appl. No.: 09/254,868

(22) PCT Filed: Jul. 14, 1998

(86) PCT No.: PCT/DE98/01962

§ 371 Date: Mar. 15, 1999

§ 102(e) Date: Mar. 15, 1999

(87) PCT Pub. No.: WO99/03373

PCT Pub. Date: Jan. 28, 1999

(30) Foreign Application Priority Data

Jul. 15, 1997 (DE) .............................. 197 30 285

(51) Int. Cl.⁷ .................................................. F16C 11/04
(52) U.S. Cl. ........................... 403/116; 403/113; 403/164
(58) Field of Search .................................... 403/112, 113, 403/116, 117, 114, 115, 103, 164, 78, 84, 14, 13; 285/907, 184, 65

(56) References Cited

U.S. PATENT DOCUMENTS

| | | | |
|---|---|---|---|
| 617,761 | * 1/1899 | Musgreave | 285/184 X |
| 783,987 | * 2/1905 | Walsh | 285/184 |
| 1,475,867 | * 11/1923 | Peterson | 285/184 |
| 1,551,332 | * 8/1925 | Schramm | 285/184 X |
| 1,753,057 | * 4/1930 | Morris | 403/103 |
| 1,822,260 | * 9/1931 | Adams | 285/184 X |
| 2,242,899 | * 5/1941 | Armbruster | 285/907 X |
| 3,902,482 | * 9/1975 | Taylor | 403/116 X |
| 4,030,378 | * 6/1977 | Kroesser | 403/116 X |
| 4,337,764 | * 7/1982 | Lerman | 403/116 X |
| 4,621,839 | * 11/1986 | Duell et al. | 285/184 |
| 5,542,774 | * 8/1996 | Hoy | 403/116 |

FOREIGN PATENT DOCUMENTS

| | | |
|---|---|---|
| 36 12 109 | 10/1987 | (DE) . |
| 37 44 702 | 12/1988 | (DE) . |
| 37 44 706 | 12/1988 | (DE) . |
| 0 365 487 | 4/1990 | (EP) . |
| 0 396 179 | 11/1990 | (EP) . |

* cited by examiner

Primary Examiner—Harry C. Kim
(74) Attorney, Agent, or Firm—Venable; Gabor J. Kelemen; Leo J. Jennings

(57) ABSTRACT

A rotating joint is provided for a profiled crossbeam with an inner cable duct. The joint includes an upper part and a lower part which are screwed to each other. The opposite front faces of the upper and lower parts have mounting flanges. The central rotating area of the upper and lower parts does not have a screw.

8 Claims, 3 Drawing Sheets

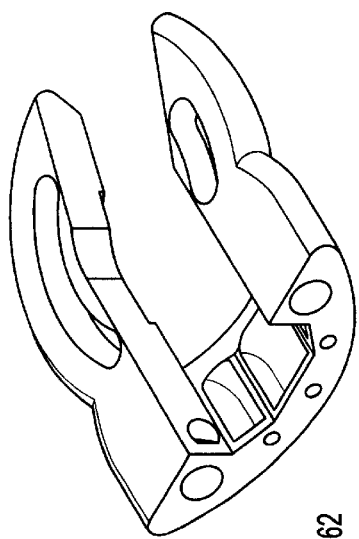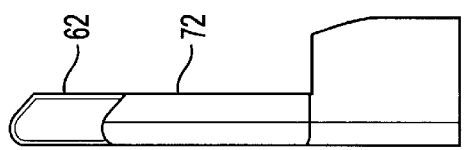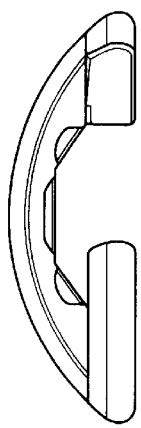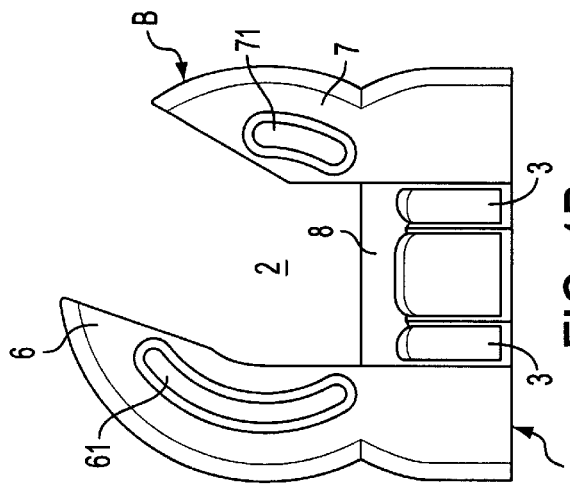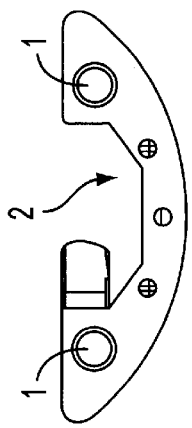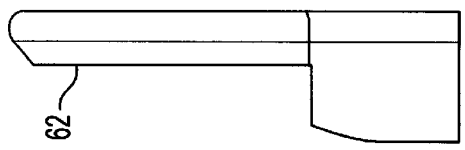

ROTATING JOINT FOR A PROFILED CROSSBEAM

BACKGROUND OF THE INVENTION

The invention relates to a rotating joint—a knuckle joint—for a profiled crossbeam with inner cable duct. The joint consists of an upper part and a lower part, which are screwed together and have mounting flanges on opposite front faces.

Rotating joints of this type are used to link frames for constructing office furniture such as desks, conference tables, etc. The frames in this case accommodate brackets to which tabletops are attached by means of a support frame for the top. It is possible to create a plurality of desk configurations and conference table configurations by linking the frames with the aid of the rotating joints and subsequently mounting the adapted tabletops.

The frames consist of vertical supports with skids at the ends facing the ground and are designed to provide a high stability. At the ends facing away from the ground, the supports are screwed to the horizontally arranged profiled crossbeams. The profiled crossbeams have an open cable duct on the side facing away from the ground, which is used to run the electrical lines for lighting and computers, as well as the telephone lines. Once the tables are assembled, the cables inside the ducts are not visible because the tabletops are arranged on the profiled crossbeams. The use of profiled crossbeams with different lengths makes it possible to create optional size tables. The rotating joints, which are arranged between the front faces of neighboring profiled crossbeams, if necessary, permit the adjustment of angles between the profiled crossbeams, thus making it possible to create asymmetrical configurations that deviate from the linear linking.

Known rotating joints have at least one screw in the center region around the rotational center of the joint. As a result of the central screw connection, the free passage through the cable duct is no longer ensured. If the cable duct holds several lines, in particular, this leads to a bunching up of lines in the central rotating range because of the screw arranged therein. In the extreme case, this can result in damage to the lines.

SUMMARY OF THE INVENTION

The invention is intended to correct the above-described problems. An object of the invention is to create a rotating joint through which the cable duct can extend unimpeded. In accordance with the invention, this object is solved in that the upper part and the lower part are designed to be screwless in their central rotating range, particularly in the center of rotation.

According to the invention, a rotating joint is created, which comprises a central, open cable duct that is not narrowed down owing to a screw connection in the central rotating range joint of the rotating joint.

One modification of the invention provides that the joint can be rotated continuously over a range of 0° to 53° and another modification provides that it can be rotated over a range of 10° to 63°. Owing to the fact that the joint can be rotated continuously, optional table configurations can be produced within the rotating range.

In addition and in a further improvement of the invention, the upper part contains elongated holes and the lower part threaded bores, which are respectively arranged on a circular arc with identical diameter. The secure connection of upper part and lower part is ensured through screws inserted into the elongated holes in the upper part and screwed into the threaded bores in the lower part of the rotating joint. Furthermore, the screwing together of upper part and lower part ensures that the joint is secured in the desired angle position. According to the invention, the central rotational region contains no screws.

It is advantageous if the joint in the assembled state has the form of a spherical segment between the mounting flanges. Owing to the rounded form of the joint on the side facing the ground, the danger of injury during the assembly of the desk or the working table is reduced.

The mounting flanges preferably contain receptacles at the free ends. A secure fastening of the joint to the adjacent crossbeams with SWT pins is ensured with the aid of the receptacles at the free ends of the mounting flanges.

Finally, it is advantageous if the upper part and the lower part are cast parts, e.g. produced in the sand-casting method, the chill-casting method or the pressure-casting method.

BRIEF DESCRIPTION OF THE DRAWINGS

FIG. 1a shows a left side view of an upper part of a rotating joint.

FIG. 1b shows a top view of the upper part.

FIG. 1c shows a right side view of the upper part.

FIG. 1d shows a bottom view of the upper part.

FIG. 1e shows an end view of the upper part.

FIG. 1f shows a perspective view of the upper part.

FIGS. 3a, 3b and 3c show an upper part and a lower part fitted together.

FIG. 3d is a view from the other side of FIG. 3c.

DETAIL DESCRIPTION OF THE PREFERRED EMBODIMENTS

The rotating joint selected for the exemplary embodiment consists of an upper part and a lower part, which parts are produced as aluminum sand-casting parts. The upper part and the lower part respectively contain a mounting flange A and a circular rotating range B in a view from above.

Figure 2F:
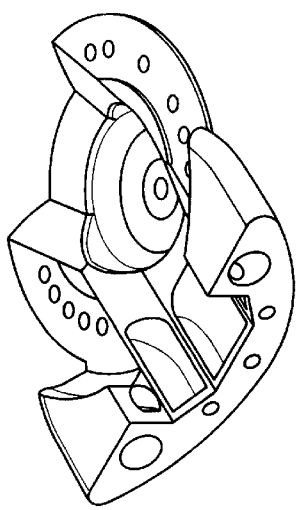
FIG. 2f shows a perspective view of the lower part.
Figure 2C:
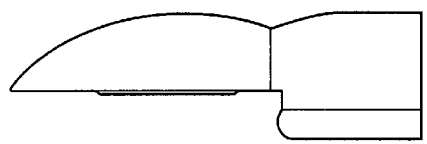
FIG. 2c shows a right side view of the lower part.
Figure 2E:
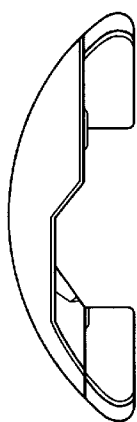
FIG. 2e shows an end view of the lower part.
Figure 2B:
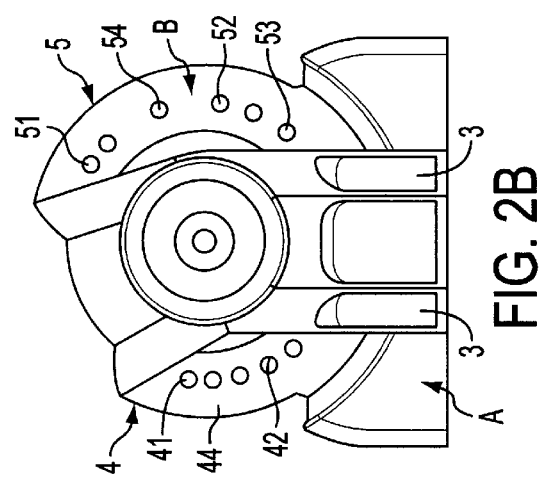
FIG. 2b shows a top view the lower part.
Figure 2D:
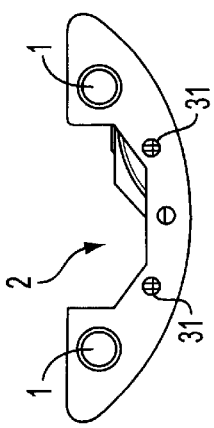
FIG. 2d shows a bottom view of the lower part.
Figures 1, 3A:
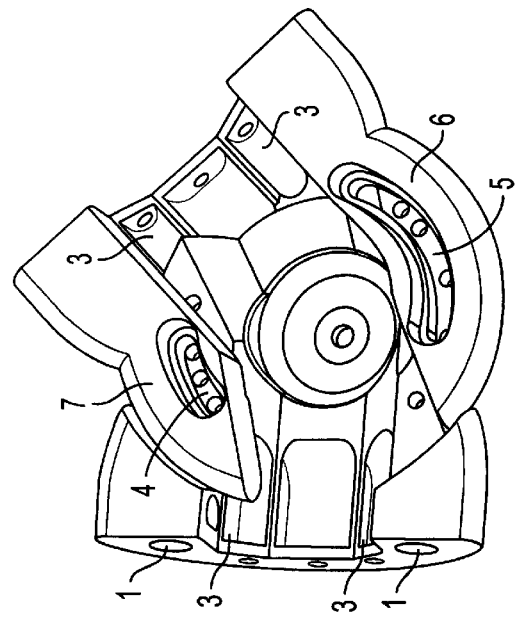
Figures 2, 3A:
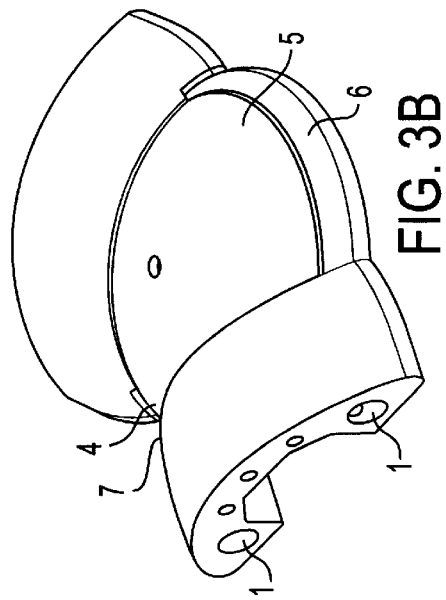
Figures 3, 3A:
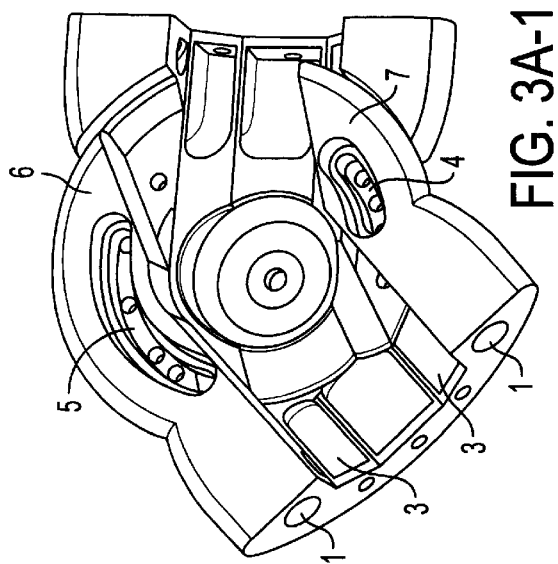
Figure 3B:
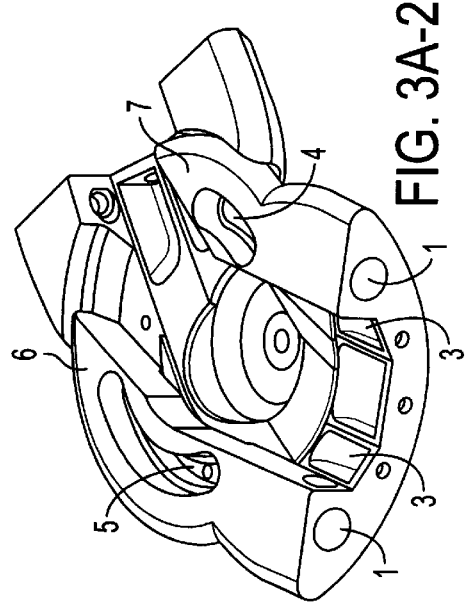

The mounting flanges A are provided with receptacles 1—FIGS. 1d and 2d—on the front faces which are pointing away from the rotating range B. In the exemplary embodiment, the receptacles 1 are designed as simple bores, into which pins are inserted during the positioning at the profiled crossbeams—not shown—which pins are present at the profiled crossbeams. A cable duct 2 with hexagonal shape in the cross section is formed between the receptacles 1. The cable duct 2 is open on the side facing away from the ground. Two indentations 3 in the form of elongated holes are inserted into the walls of cable duct 2 and extend in the direction of the front faces of the mounting flanges. Extending from the front faces, bores 31 are worked into the indentations 3. The bores 31 are used to screw together the joint and the profiled crossbeams. In addition, the joint is fastened to and guided with the adjoining profiled crossbeams through slanted screw connections that are built into pins arranged on the crossbeams. The slanted screw connections at the same time serve to pull the joint toward the crossbeam profile. Furthermore, these slanted screw connections make it possible to avoid caps in the visible range of the crossbeam/joint.

The mounting flanges A are tapered from the front faces toward the direction of the rotating range, where they change to a circular arc, following a short, straight section. The circular arc ends in the circle-shaped embodiment of the rotating range B. The rotating range B is designed as a complete circle for the lower part of the rotating joint. The circular embodiment of the rotating range B for the upper part follows from the imagined continuation of the circular arc since it changes to this arc without interruption on the side facing the mounting flange A, thereby creating a level surface.

Figure 2A:
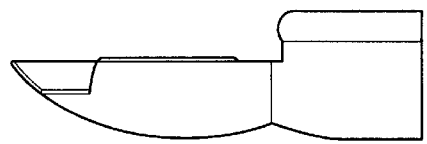
FIG. 2a shows a left side view of a lower part of the joint.

The rotating range B of the lower part is visibly set off against the mounting flange A through a step in the height. Owing to another step in the height, the cable duct 2 is formed in the rotating range B of the lower part of the rotating joint, so that the lower part of the rotating joint has three horizontal height levels. The cable duct 2 has a trapezoid profile in the rotating range B, as seen in the vertical section. The cable duct divides the rotating range B of the lower part into two parts 4 and 5, wherein the cable duct has a bend approximately in the center of the circular rotating range B of the lower part, that is to say toward the left in the drawing in FIG. 2b. Five threaded bores 41 and 42—M8×10 blind hole—are provided in the left part 4 of the rotating range B for the lower part, whereas six threaded bores 51, 52 and 53—M8×10—are provided in the right part 5 (M8 refers to a standard ISO thread according to DIN 13 T1). The bores 41 and 42 of part 4 as well as the bores 51, 52 and 53 of the part 5 are arranged on a circular arc. The rotating range B of the lower part has the form of a spherical segment—FIGS. 2a and 2c—as seen in a view from the side. FIG. 2b shows that the parts 4 and 5 have smooth surfaces 44 and 54.

FIGS. 1a and c show that the rotating range B of the upper part is designed in the shape of a disk, which is divided into two parts 6 and 7 by the cable duct 2. On the side facing the ground—the bottom—smooth undersides 62 and 72 are formed on parts 6 and 7. The cable duct 2 has a bend approximately in the center of rotating range B, meaning toward the right in the drawing in FIG. 1b. In contrast to the cable duct 2 of the lower part, the cable duct 2 in the rotating range B of the upper part is delimited on both sides by vertical walls. In the rotating range B, the cable duct 2 with undercut 8 is open toward the top and the bottom. The part 6 of rotating range B of the upper part has a bow-shaped elongated hole 61 for M8, whereas the part 7 has a bow-shaped elongated hole 71 for M8.

In the assembled state of the rotating joint, the rotating ranges B of the upper part and the lower part are located one above the other. The bores 41, 42 as well as 51, 52 and 53 in that case are arranged in various combination positions below the elongated holes 61 and 71. The level lower surfaces 62 and 72 of parts 6 and 7 of the upper part in this case rest on the level upper surfaces 44 and 54 of the parts 4 and 5 of the lower part. The vertical walls forming the cable duct 2 of the upper part hereby raise the cable duct of the lower part to the same height level as the mounting flanges of the lower part. As a result of this, a continuous cable duct 2 is formed that extends from the front face of mounting flange A of the upper part to the front face of mounting flange A of the lower part, which cable duct has identically high side walls along its total course. A level surface is formed to the left and right of the cable duct 2, which extends from the front face of the upper part to the front face of the lower part.

Threaded screws M8 are fitted through the elongated holes 61 and 71 of the upper part and are screwed into the threaded bores in the lower part to secure the angle position of the joint. Not all threaded bores are used in this case. The threaded bore 51, for example, is not used in an arrangement in which the front faces of the mounting flanges of the upper part and the lower part are positioned diametrically opposite each other. In that case, the threaded bore is covered by a section of part 6 of the rotating range B of the upper part that is adjacent to the elongated hole 61. Four threaded screws should be used for an optimum securing of upper part and lower part. However, fewer screws will also ensure the operational safety. The elongated holes make it possible to adjust the rotating joint continuously over a range of 0° to 53° or 10° to 63°. As a result, the standard adjustment angles of 15°, 22.5°, 30°, 45° and 60° can also be realized. By screwing together the upper part and the lower part, as well as by fastening the joint to the adjacent profiled crossbeams, it is also possible to compensate joint tolerances, resulting from the production of the frame, over a specific range without loss of stability or adjustability.

What is claimed is:

1. A rotating joint for a profiled crossbeam with an inner cable duct, comprising:

an upper part having bow-shaped elongated holes; and a lower part having threaded bores, wherein the upper part and the lower part are adapted to be screwed together and are provided with mounting flanges on front faces thereof that are pointing away from each other, wherein the bow-shaped elongated holes and the threaded bores are each respectively arranged along circular arcs with identical diameters.

2. A rotating joint according to claim 1, wherein the upper part and the lower part have a center of rotation without screws being present at the centers of rotation.

3. A rotating joint according to claim 1, wherein the joint can be turned continuously in a range of 0° to 53°.

4. A rotating joint according to claim 1, wherein the joint can be turned continuously in a range of 10° to 63°.

5. A rotating joint according to claim 1, wherein the joint when fully assembled has the form of a spherical segment between the mounting flanges.

6. A rotating joint according to claim 1, wherein the mounting flanges are provided with receptacles on the front faces.

7. A rotating joint according to claim 1, wherein the upper part and the lower part are cast parts.

8. A rotating joint according to claim 1, wherein the upper part and the lower part each have a central portion without screws being present in the central portions.

* * * * *